United States Patent Office 2,784,495
Patented Mar. 12, 1957

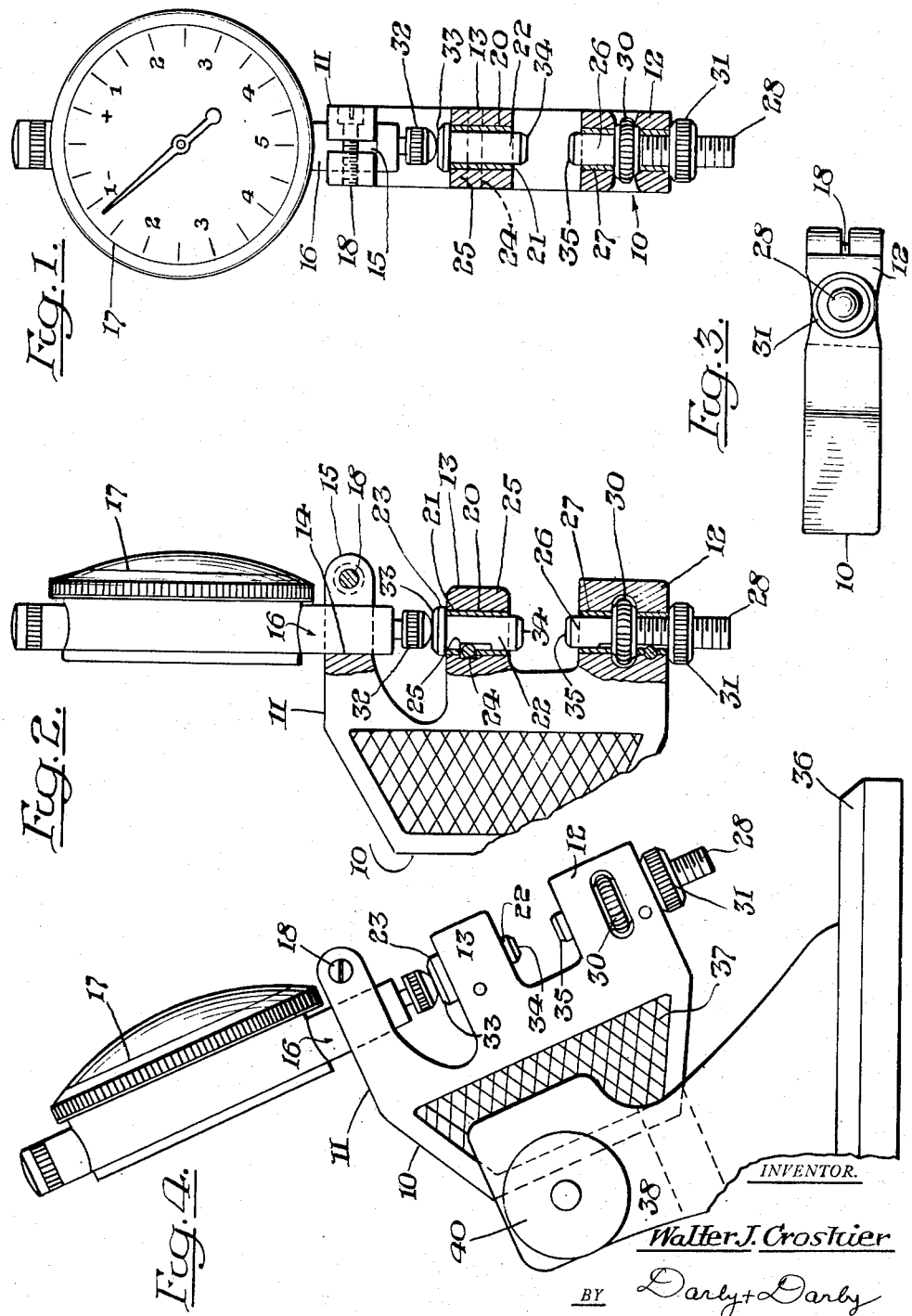

2,784,495

COMBINATION DIAL SNAP AND THICKNESS GAGE

Walter J. Croshier, Hyde Park, N. Y., assignor to Standard Gage Company, Inc., Poughkeepsie, N. Y., a corporation of New York Application April 9, 1954, Serial No. 422,171

5 Claims. (Cl. 33—147)

The present invention relates to precision linear gages and particularly to a gage which is capable of utilization both as a dial snap gage and as a dial thickness gage.

At the present time separate gages are utilized for the checking of thickness of flat material and for the checking of the diameter of round parts. It is frequently desirable to have a single gage utilizable for both of these purposes, but heretofore no such combination gage has been available. The present invention supplies this combination in a very simple manner and is particularly adapted to the measurement of relatively small parts. In one instance a gage has been dimensioned to check thickness from 0 to 0.075" and to check diameters from 0" to 0.375".

The present invention consists primarily of the usual dial snap gage having a C-shaped gaging frame with the usual adjustable anvil in the lower arm of the C and the indicator in the upper arm of the C, the frame being modified to the form of an E and provided with a gaging pin in the central arm of the E in alignment with the anvil shank and indicator stem.

It is an object of the invention to provide in a single instrument means for measuring both the thickness of planar pieces and diameters of round pieces.

It is another object of the invention to provide such a combination gage in which the indicating element is the ordinary precision dial indicator.

It is a further object of the invention to provide such a combination gage requiring only minor modifications of the usual snap gage frame and consequently readily and inexpensively manufactured.

Other objects and features of the invention will become apparent when the following description is considered in connection with the annexed drawings, in which, Figure 1 is a front elevation of the combination dial snap gage and thickness gage of my invention, the frame portion being partially in section in order to illustrate the construction;

Figure 2 is a side elevation of the device of Figure 1, the frame elements being again in section in order to illustrate the construction;

Figure 3 is a bottom plan view of the gage of Figures 1 and 2; and

Figure 4 is a side elevation showing the gage of the present invention mounted in a comparator stand.

Referring now to the drawings, the various elements of the combination gage structure are mounted in a frame 10 which is generally similar to the usual dial snap gage frame, and comprises an upper arm 11 and a lower arm 12. However, the frame in this instance is provided with a central arm 13. The upper arm 11 is provided with a bore 14 therethrough and with a slot leading into the bore from the front the slot being designated 15, Figure 1. The slot 15 provides a clamping means for the stem 16 of the dial indicator gage 17. The stem 16 is clamped in place by means of the screw 18 which passes through a clearance hole in the portion of the arm 11 at one side of the slot 15 and is threaded into the portion at the opposite side of the slot 15.

The arm 13 of the frame is provided with a bore 20 in which there is a bearing 21 which slidably mounts a gaging pin 22. Pin 22 is provided with an enlarged head 23 which limits its movement in a downward direction, and in addition, its upward movement is limited by the cross pin 24 which cooperates with a flatted notch 25 in the rear surface of the gaging pin 22, this pin not only limiting the upward movement, but also preventing rotation of the gaging pin in its bushing.

Mounted in the lower arm 12 of the frame 10 is a gaging pin 26, this pin being mounted in a bushing 27 and being capable of axial adjustment and being lockable in its adjusted position by means of the adjusting and locking device comprising the threaded portion 28 of the gaging pin together with the adjusting nut 30 and the locking nut 31, the parts just mentioned being described in detail in Patent No. 2,640,270, issued on June 2, 1953, to Erik H. Aldeborgh and assigned to the assignee of the present application.

The dial indicator 17 is provided with a hemispherical measuring contact 32. The gaging pin 22 is provided with two flat surfaces 33 and 34 and the lower adjustable gaging pin 26 is provided with the flat measuring surface 35. The surfaces 33, 34 and 35 are parallel to each other and perpendicular to the axis of their respective pins 22 and 26. They are preferably faced with tungsten carbide or are chromium plated to provide good wearing surfaces.

It will be seen that when it is desired to measure the thickness of a plate-like member it may be inserted between the upper surface 33 of the gaging pin 22 and the contact point 32 of the dial indicator 17. Since the indicator is mounted in the arm 11 in such a manner that it may be adjusted to give a zero reading when the contact point 32 is in contact with the surface 33, the thickness of a piece inserted between the contact point 32 and the surface 33 may be directly indicated on the dial, in other words, the upper elements of the gage are utilized in the ordinary manner of a thickness gage of the dial indicator type. A lifting lever, not shown in the drawing, is usually provided to separate these gaging surfaces while entering the workpiece.

If a round piece is to be measured it is inserted between the lower surface 34 of the gaging pin 22 and the upper surface 35 of the adjustable gaging pin 26, that is, in the normal manner of use of a dial snap gage. As a piece is inserted as stated it will cause movement of the pin 22 which movement will be transmitted through that pin to the plunger of the dial indicator gage 17 and will give a reading of diameter. As will be obvious, the device, when used either as a thickness or diameter gage, may be utilized to compare a piece with a standard, the standard setting being made in a usual manner as with the aid of a plug gage master or a suitable stack or array of Johansson or Hoke blocks.

If it is desirable to use the present instrument as a comparator for bench operation it may readily be mounted in a stand such as is indicated at 36 in Figure 4, the portion 37 of the gage frame 10 being clamped to a bifurcated portion 38 of the stand 36 by means of a clamping screw 40.

While I have described preferred embodiments of my invention it will be understood that many other modifications may be made without deviating from the spirit of my invention. I wish therefore to be limited not by the foregoing description but, on the contrary, solely by the claims granted to me.

What is claimed is:

1. A combination dial snap and thickness gage comprising, in combination, an E-shaped frame, said frame having aligned bores in the arms thereof, a dial indicator mounted on the upper arm of said frame with the measuring plunger thereof extending through the bore of said upper arm, a gaging pin slidably mounted in the bore in the middle arm of said frame, said gaging pin having an upper flat surface which cooperates with the measuring plunger of said dial indicator to form a thickness gage, and an adjustable gaging anvil having a shank mounted in the bore of the lower arm of said frame, said gaging pin having a plane surface at its lower end, said gaging pin cooperating with said gaging anvil to measure a piece therebetween, said gaging pin transmitting measuring movement to the measuring plunger of said dial indicator.

2. A device as claimed in claim 1, characterized in that said dial indicator is provided with a hemispherical contact point at the end of its measuring plunger and said gaging pin and anvil are provided with plane parallel surfaces, said surfaces extending at right angles to said aligned bores.

3. A device as claimed in claim 2, characterized in that said gaging pin is slidably mounted for axial movement in the bore in said middle arm of said E-shaped frame, and further characterized in that said gaging pin has a flatted notch therein and a cross pin is mounted in said middle arm of said frame and extends across said flatted notch to limit the axial movement of said gaging pin in an upward direction and to prevent rotation of said gaging pin.

4. A device as claimed in claim 1, characterized in that said anvil is adjustable toward and away from said gaging pin, said anvil shank having means cooperating therewith to lock said anvil in an adjusted position.

5. A device as claimed in claim 1, characterized in that said gaging pin serves to transmit measuring motion to said dial indicator plunger when gaging is performed between said gaging anvil and the lower surface of said gaging pin and said gaging pin is provided with an enlarged head which seats against the middle arm of said frame, said gaging pin serving as a fixed anvil when gaging is performed between said upper surface of said gaging pin and said measuring plunger of said dial indicator.

References Cited in the file of this patent

UNITED STATES PATENTS

| 1,425,283 | Pratt | Aug. 8, 1922 |
| 2,645,020 | Foster | July 14, 1953 |

FOREIGN PATENTS

| 369,503 | Germany | Feb. 20, 1923 |